United States Patent [19]
Stein

[11] Patent Number: 5,950,582
[45] Date of Patent: Sep. 14, 1999

[54] INTERNAL COMBUSTION ENGINE WITH VARIABLE CAMSHAFT TIMING AND INTAKE VALVE MASKING

[75] Inventor: Robert Albert Stein, Saline, Mich.

[73] Assignee: Ford Global Technologies, Inc., Dearborn, Mich.

[21] Appl. No.: 09/093,563

[22] Filed: Jun. 8, 1998

[51] Int. Cl.$^6$ ............................... F01L 1/34; F02B 31/00
[52] U.S. Cl. .................................... 123/90.15; 123/90.17; 123/306; 123/308
[58] Field of Search ........................... 123/90.15, 90.16, 123/90.17, 306, 308, 432; 60/285

[56] References Cited

U.S. PATENT DOCUMENTS

| | | |
|---|---|---|
| 2,183,674 | 12/1939 | Erren . |
| 3,441,009 | 4/1969 | Rafanelli . |
| 4,285,310 | 8/1981 | Takizawa et al. . |
| 4,327,676 | 5/1982 | McIntire et al. . |
| 4,344,393 | 8/1982 | Etoh et al. . |
| 4,354,463 | 10/1982 | Otani et al. ......................... 123/308 |
| 4,365,597 | 12/1982 | Iizuka et al. . |
| 4,401,069 | 8/1983 | Foley . |
| 4,494,504 | 1/1985 | Yagi et al. . |
| 4,499,870 | 2/1985 | Aoyama . |
| 4,516,542 | 5/1985 | Aoyama et al. . |
| 4,520,775 | 6/1985 | Nakamura . |
| 4,522,179 | 6/1985 | Nishimura et al. . |
| 4,534,323 | 8/1985 | Kato et al. . |
| 4,552,112 | 11/1985 | Nagao et al. . |
| 4,570,590 | 2/1986 | Kawai et al. . |
| 4,584,974 | 4/1986 | Aoyama et al. . |
| 4,667,636 | 5/1987 | Oishi et al. . |
| 4,702,207 | 10/1987 | Hatamura et al. . |
| 4,911,113 | 3/1990 | Yamada . |
| 4,932,377 | 6/1990 | Lyle . |
| 4,932,378 | 6/1990 | Hitomi et al. . |
| 4,974,566 | 12/1990 | LoRusso et al. . |
| 5,119,784 | 6/1992 | Hashimoto et al. . |

(List continued on next page.)

FOREIGN PATENT DOCUMENTS

| | | |
|---|---|---|
| 0105934 | 4/1984 | European Pat. Off. . |
| 0 724 067 | 7/1996 | European Pat. Off. . |
| 0 777 038 | 6/1997 | European Pat. Off. . |
| 52-34108 | 3/1977 | Japan . |
| 55-32976 | 3/1980 | Japan . |
| 55-109724 | 8/1980 | Japan . |
| 57-183553 | 11/1982 | Japan . |
| 58-124019 | 7/1983 | Japan . |
| 58-148230 | 9/1983 | Japan . |
| 60-11206 | 3/1985 | Japan . |
| 60-85222 | 5/1985 | Japan . |
| 61-12940 | 1/1986 | Japan . |
| 61-49121 | 3/1986 | Japan . |
| 2-230920 | 9/1990 | Japan . |
| 3-202619 | 9/1991 | Japan . |

OTHER PUBLICATIONS

Dual Equal VCT–A Variable Camshaft Timing Strategy for Improved Fuel Economy and Emissions, SAE Technical Paper Series 950975, pp. 1–13, R. Stein, K. Galietti and T. Leone, Mar. 1995.

A Study of Combustion Stability of Non–throttling S.I. Engine with Early Intake Valve Closing Mechanism, Honda R&D Co., Ltd., Japan, 945009, pp. 78–87, H. Sono & H. Umiyama.

A Study of Vehicle Equipped with Non–throttling S.I. Engine with Early Intake Valve Closing Mechanism, Honda R&D Co., Ltd., Japan, 930820, pp. 17–27, H. Sono, H. Umiyama, Y. Urata, K. Shimizu, Y. Fujiyoshi and K. Fukuo.

*Primary Examiner*—Weilun Lo
*Attorney, Agent, or Firm*—Jerome R. Drouillard

[57] ABSTRACT

A reciprocating internal combustion engine has a pilot mask situated about the intake valve seat and extending into the engine cylinder and a variable camshaft timing drive system which positions the camshaft such that the lift of the intake valve and the height of the pilot mask are approximately equal when the piston is moving at the point of its greatest velocity during the intake stroke.

18 Claims, 5 Drawing Sheets

U.S. PATENT DOCUMENTS

| | | |
|---|---|---|
| 5,133,310 | 7/1992 | Hitomi et al. . |
| 5,165,374 | 11/1992 | Chapman et al. . |
| 5,190,013 | 3/1993 | Dozier . |
| 5,228,422 | 7/1993 | Wakeman . |
| 5,230,320 | 7/1993 | Hitomi et al. . |
| 5,236,332 | 8/1993 | Satou et al. . |
| 5,239,960 | 8/1993 | Sasaki et al. . |
| 5,359,972 | 11/1994 | Isaka . |
| 5,408,966 | 4/1995 | Lipinski et al. . |
| 5,443,050 | 8/1995 | Hitomi et al. . |
| 5,467,748 | 11/1995 | Stockhausen . |
| 5,487,365 | 1/1996 | Isaka . |
| 5,596,965 | 1/1997 | Nagata ................................... 123/308 |
| 5,606,960 | 3/1997 | Takahashi et al. . |
| 5,640,941 | 6/1997 | Hazen et al. ............................ 123/306 |
| 5,642,703 | 7/1997 | Stockhausen et al. . |
| 5,669,341 | 9/1997 | Ushirono et al. . |

INTERNAL COMBUSTION ENGINE WITH VARIABLE CAMSHAFT TIMING AND INTAKE VALVE MASKING

FIELD OF THE INVENTION

The present invention relates to a reciprocating internal combustion engine having variable valve timing and a pilot mask which is applied to the cylinder head adjacent to a portion of the intake valve seat.

DISCLOSURE INFORMATION

Operation of an internal combustion engine with increasingly higher levels of exhaust diluent, although almost inexorably having the effect of reducing emissions of oxides of nitrogen (NOx), may also cause the unwanted effect of increasing feedgas emissions of unburned hydrocarbons and carbon monoxide. The present invention illustrates an engine in which oxides of nitrogen are simultaneously decreased along with fuel consumption, as are hydrocarbon emissions. FIG. 4 illustrates the effect of operating an engine according to the present invention. Note that FIG. 4a illustrates valve timing being retarded progressively from the point labeled base timing to 46 crankshaft degrees of valve timing retard. The progressive valve timing retard is accompanied by a steady reduction in feedgas (engine out) emissions of NOx.

FIG. 4b illustrates that brake specific hydrocarbon (BSHC) and brake specific carbon monoxide (BSCO) decrease along with brake specific NOx as the valve or camshaft timing is retarded according to the plot of FIG. 4a. FIG. 4c illustrates that the coefficient of variation of IMEP, in other words, the consistency of the pressure produced in the engine cylinder remains roughly the same throughout the range of operation as camshaft timing is retarded from base timing to the total 46 degrees. Experimental results achieved by the inventors indicate that up to a 70% reduction in feedgas NOx was achieved with a system according to the present invention. This is a remarkably unexpected result.

In essence, as valve timing is progressively retarded, NOx is suppressed because the residual exhaust fraction within the combustion chamber increases substantially. Normally, however, this would cause misfire or uneven combustion with objectionable results. The unexpected result here is that the engine is able to tolerate the high residual fraction because the increase in charge motion compensates or counteracts the potential degradation in combustion quality. This increased charge motion is an important part of the present invention.

SUMMARY OF THE INVENTION

A reciprocating four-stroke cycle internal combustion engine has a cylinder block having at least one cylinder, a piston, a crankshaft, a connecting rod joining the piston and crankshaft, an intake manifold, and intake and exhaust poppet valves servicing the cylinder. The engine also includes a cylinder head mounted upon the cylinder block so as to close the cylinder. The cylinder block has at least one intake port having a valve seat for the intake valve. A pilot mask situated about the intake valve seat and extending into the cylinder increases the angular momentum of the charge entering the engine cylinder. The camshaft is used to actuate the intake valve. A camshaft drive rotates the camshaft and adjusts the rotational timing of the camshaft with respect to the crankshaft. The camshaft has a base timing. Finally, a controller operates the camshaft drive so as to position the camshaft such that the lift of the intake valve and the height of the pilot mask are approximately equal when the piston is moving at the point of its greatest velocity during the intake stroke.

According to another aspect of the present invention, the controller operates the camshaft drive such that at the base camshaft timing, the intake lift reaches approximately 80% of its maximum lift at the point of maximum piston speed, whereas at the operating point characterized by maximum camshaft retard, as noted above, intake valve lift is only approximately equal to the pilot mask height at the point of maximum piston speed. This means that the maximum intake valve lift will occur slightly after the point of maximum piston speed.

An engine according to the present invention may further comprise a charge motion control valve operated by the controller to further modify the angular momentum of charge entering the cylinder. The charge motion control valve may be operated by the controller such that the valve is closed during operation at low loads and open during operation at medium to full engine loads.

The controller operates the camshaft drive such that the valve timing is retarded by approximately 40 to 50 degrees from base timing whenever the intake valve lift approximates the mask height at the point of maximum piston speed.

An engine according to the present invention may further comprise a fuel delivery system operated by the controller such that the engine will be furnished with sufficient fuel to achieve fuel lean combustion during normal operating conditions and stoichiometric combustion during regeneration of a NOx trap associated with the engine. The controller may operate the camshaft drive such that once the camshaft timing has been established at a particular engine speed and load, the camshaft timing will be maintained at approximately a constant value during both lean and stoichiometric combustion.

According to yet another aspect of the present invention, a single camshaft may be employed for the purpose of operating both the intake and exhaust valves of a given cylinder.

It is an advantage of the present invention that NOx, unburned hydrocarbons, and carbon monoxide may simultaneously be controlled while at the same time producing acceptable combustion quality and good fuel economy.

It is a further advantage of the present invention that fuel efficiency comparable to that produced with direct cylinder injection of gasoline may be achieved with port-type fuel injection.

Other features, objects and advantages of the present invention will become apparent to the reader of this specification.

DETAILED DESCRIPTION OF PREFERRED EMBODIMENTS

Figure 1:
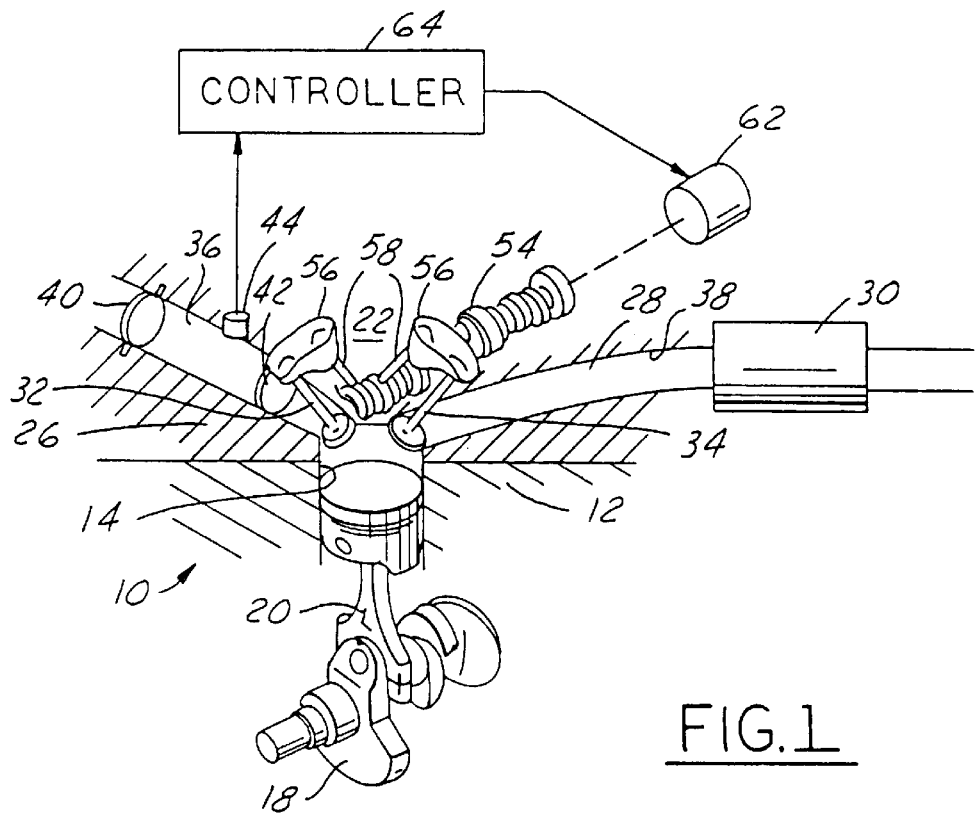
FIG. 1 is a schematic representation of an engine having a camshaft timing and charge motion control system according to the present invention.

As shown in FIG. 1, an engine 10 has a cylinder block 12 containing cylinder 14, with piston 16 reciprocably mounted therein. Piston 16 is connected with crankshaft 18 by means of connecting rod 20. Cylinder head 22 is either attached to or integrally joined with intake manifold 26 and exhaust manifold 28. Exhaust gases leaving the engine pass through exhaust port 38 and then to exhaust after-treatment device 30.

Exhaust after-treatment device 30 may comprise either a NOx trap, a NOx catalyst, a three-way catalyst, a thermal reactor, or other type of emission control device known to those skilled in the art and suggested by this disclosure. In the event that a NOx trap is used with an engine according to the present invention, the air/fuel ratio may be controlled from lean to stoichiometric so as to provide improved fuel economy along with the capability of purging a NOx trap.

Flow of intake air and fuel into cylinder 14 is controlled by means of intake valve 32 which is operated by one of rocker arms 56, one of push rods 58, and camshaft 54. Those skilled in the art will appreciate in view of this disclosure that camshaft 54 could be mounted at any one of a variety of locations within engine 10. Moreover, roller finger followers or direct acting bucket tappets, or yet other types of valve actuating equipment could be employed with a system according to the present invention. Further, two camshafts could be employed, with one camshaft actuating the intake valves and a second camshaft actuating the exhaust valves.

Camshaft drive 62, which is operated by controller 64, rotates camshaft 54 and adjusts the rotational timing of camshaft 54 with respect to crankshaft 18. Camshaft 54 has a base timing at which 80% of the maximum lift of intake valve 32 occurs at approximately the point of maximum piston speed. This relationship between intake valve lift and piston speed will be explored further in connection with FIG. 3.

Figure 3:
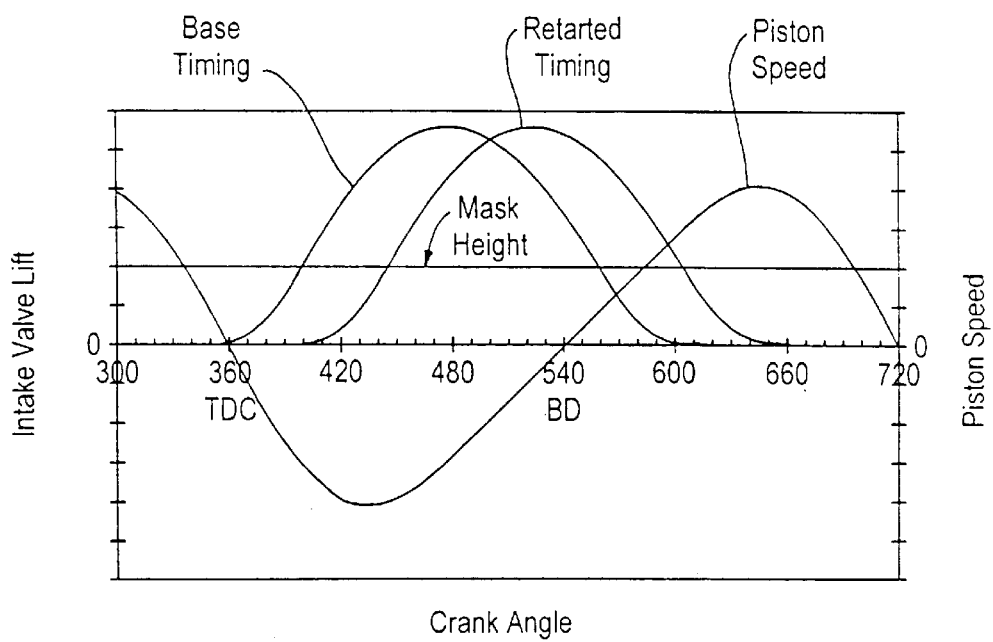
FIG. 3 illustrates valve timing and mask geometry considerations according to one aspect of the present invention.

Controller 64, which is drawn from the class of controllers well known to those skilled in the art of electronic engine controls, receives a variety of inputs such as from manifold absolute pressure sensor 44. Controller 64 operates camshaft drive 62 and charge motion control valve 42 so as to allow a high level of residual exhaust fraction in the combustion chamber defined by piston 16 and cylinder head 22, coupled with acceptable combustion stability. FIG. 3 shows why this is possible. FIG. 3 is a plot of base camshaft timing, retarded camshaft timing, and piston speed, all against crank angle. When the engine is operating at base timing, the intake valve lift is matched with mask height prior to the point at which speed of the piston 16 reaches its maximum level. However, when camshaft 54 is placed into a retarded position, which in FIG. 3 is about 46 crankshaft degrees, the lift of intake valve 32 matches the height of pilot mask 48, (shown in FIGS. 2 and 9–11), only slightly after piston 16 has reached its maximum speed. This causes a large amount of the air passing in the cylinder to be forced to a higher angular momentum by virtue of pilot mask 48.

Mask 48 is said to be a pilot mask because the height of the mask is only about 30–40% of the total lift of intake valve 32. This is beneficial because mask 48 will not significantly restrict the flow of fresh charge into cylinder 14 when engine 10 is operated with camshaft 54 in the normal or base timing position. This is shown in FIG. 3 because, as noted above, intake valve 32 will open past the point at which it is masked prior to the time at which piston 16 reaches maximum velocity.

Figure 2:
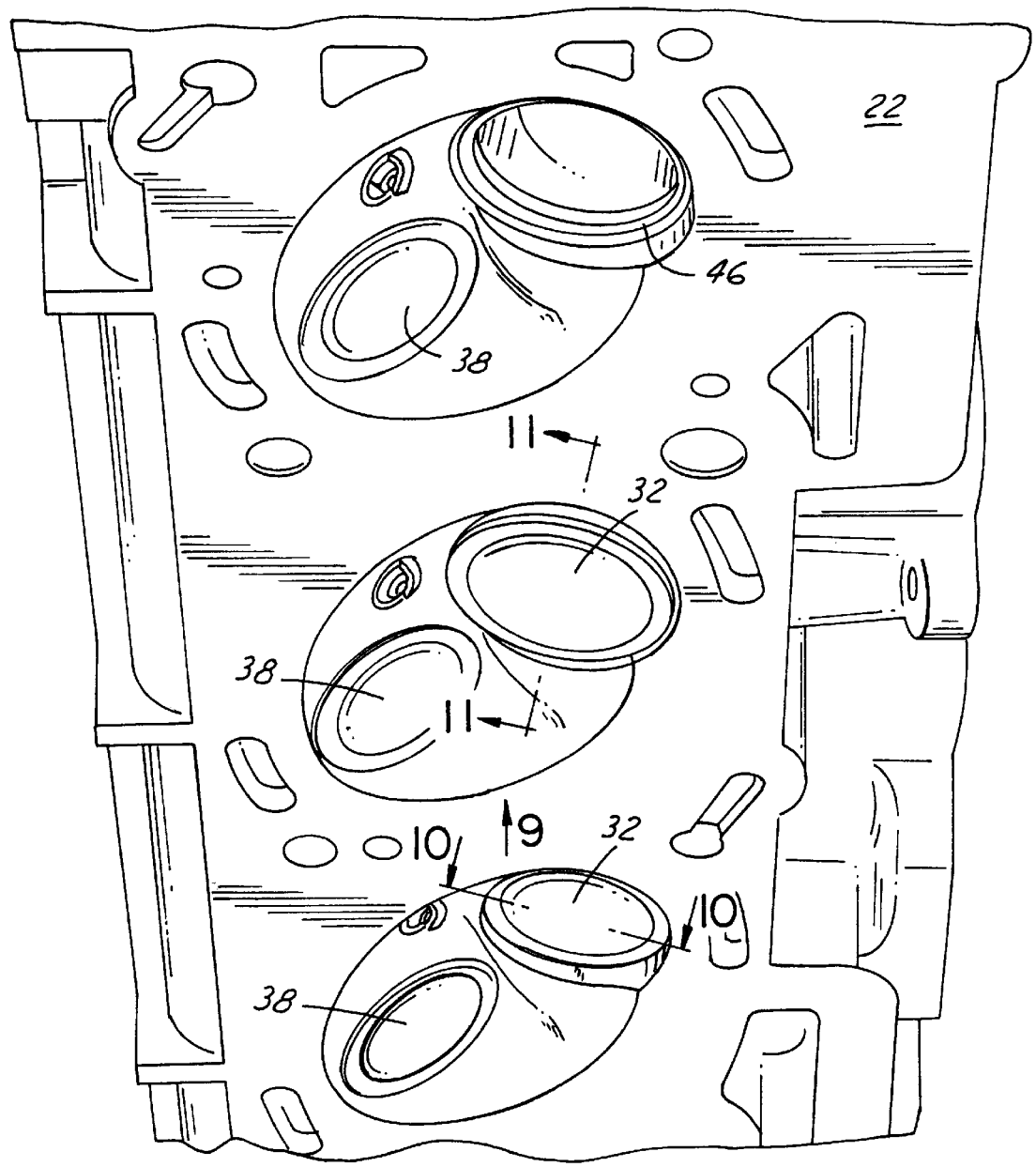
FIG. 2 illustrates a cylinder head having a pilot mask situated about the intake valve according to one aspect of the present invention.
Figure 4A:
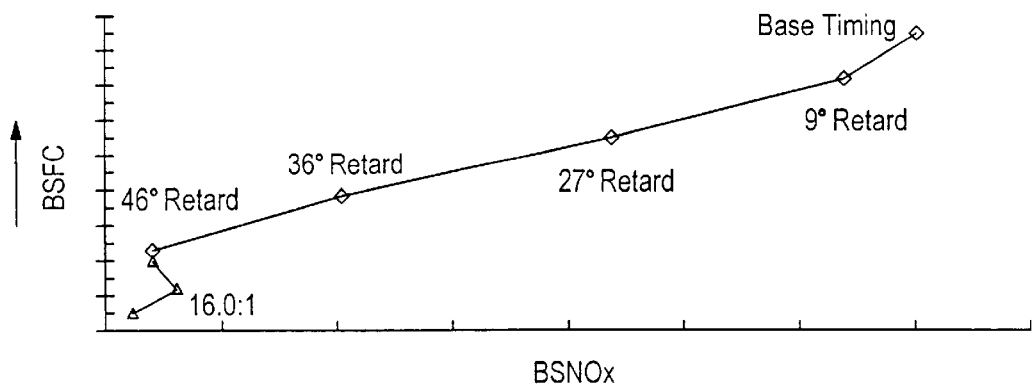
FIGS. 4a, 4b, and 4c illustrate several operating parameters of an engine according to the present invention.
Figure 4B:
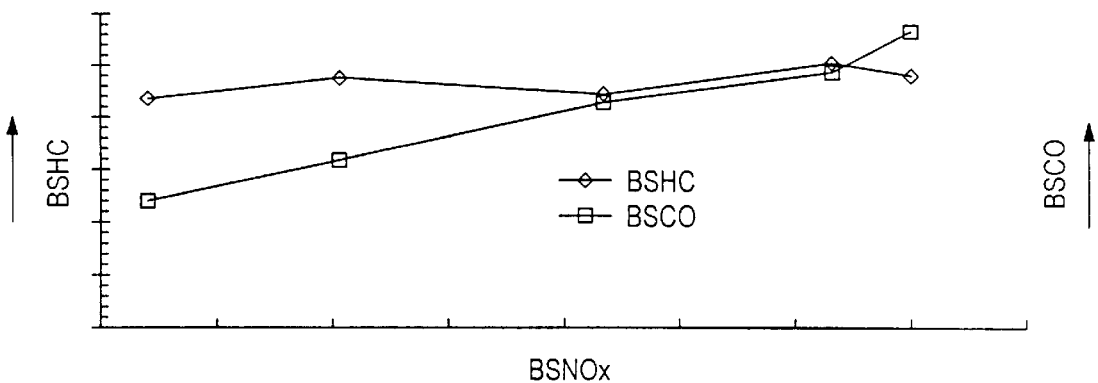
Figure 4C:
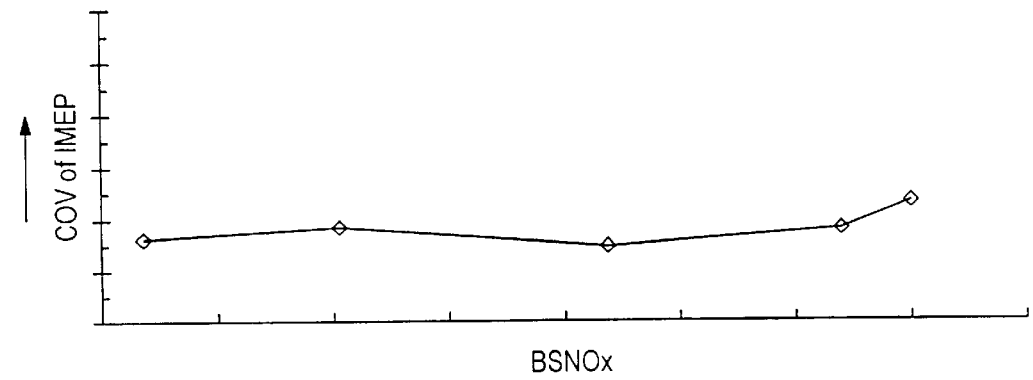

As shown in FIG. 2, mask 48 comprises a dam formed about a portion of intake valve seat 46. With only a couple of millimeters between the head of intake valve 32 and mask 48, air entering cylinder 14 will move as shown in FIGS. 5–8.

Figure 5:
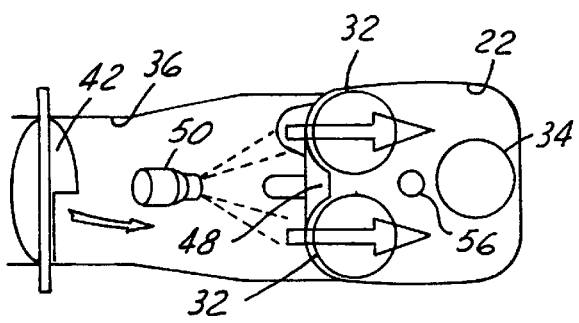
FIG. 5 is a schematic plan view of an engine having a combustion system and single exhaust valve according to the present invention.
Figure 6:
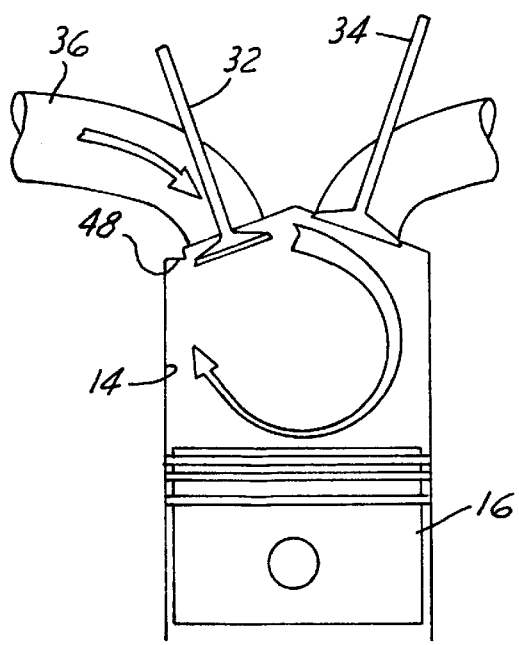
FIG. 6 is a sectional schematic view of an engine according to FIG. 5.

FIG. 5 illustrates an engine having CMCV 42, fuel injector 50, two intake valves 32, and a single exhaust valve 34. Spark plug 52 starts combustion events within cylinder 14. Mask 48 is applied so that air flowing through each of intake valves 32 of FIG. 5 will generate tumble within cylinder 14. This tumble is shown in FIG. 6. As described above, mask 48 will increase charge motion when camshaft 54 is operated in a retarded position, but will offer little restriction of flow when camshaft 54 is operating at its base timing, because of the difference in synchronism between piston speed and valve opening position.

Figure 7:
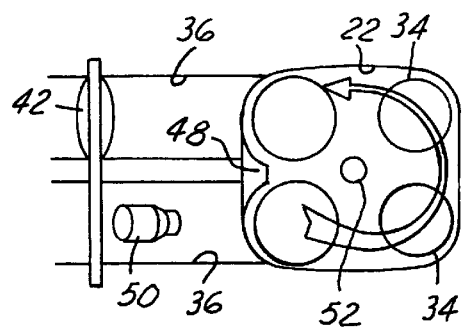
FIG. 7 is a schematic plan view of an engine having two exhaust valves according to the present invention.
Figure 8:
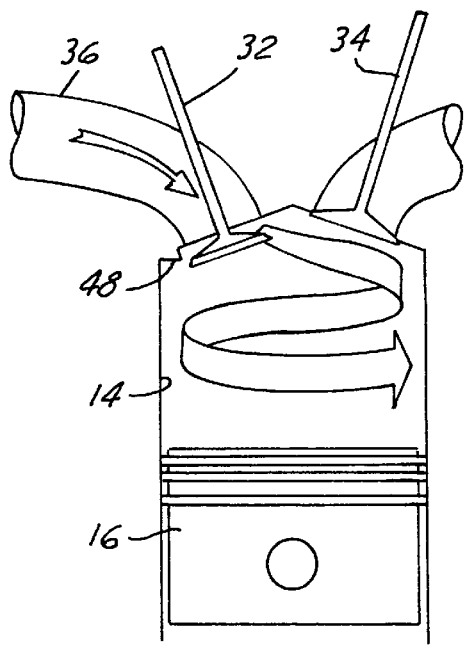
FIG. 8 is a sectional schematic view of an engine according to FIG. 7.
Figure 9:
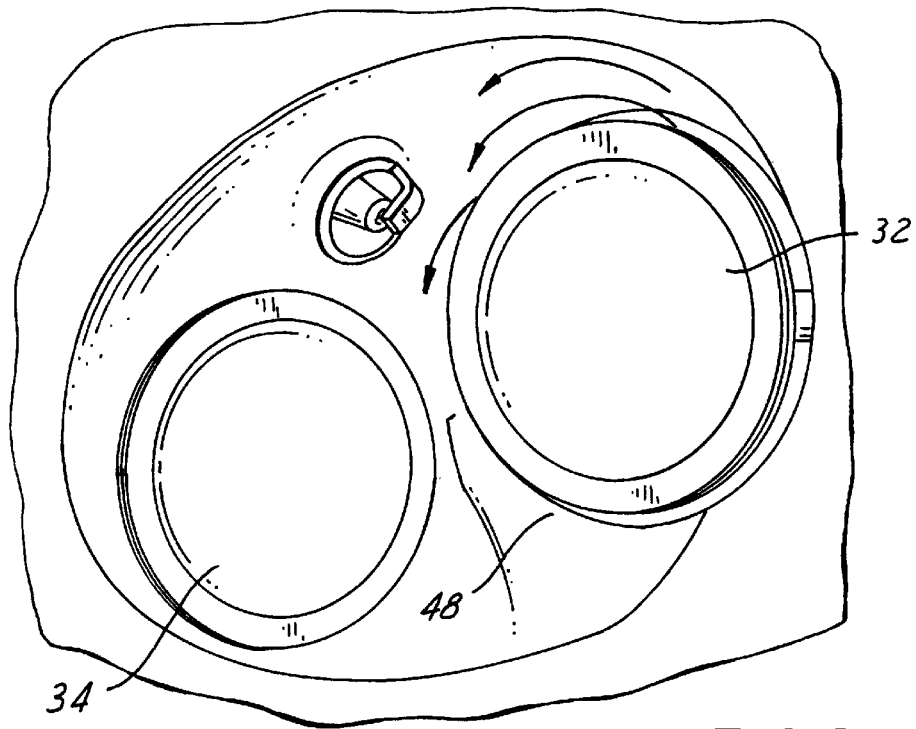
FIG. 9 is a perspective view of a portion of the cylinder head of FIG. 2.
Figure 10:
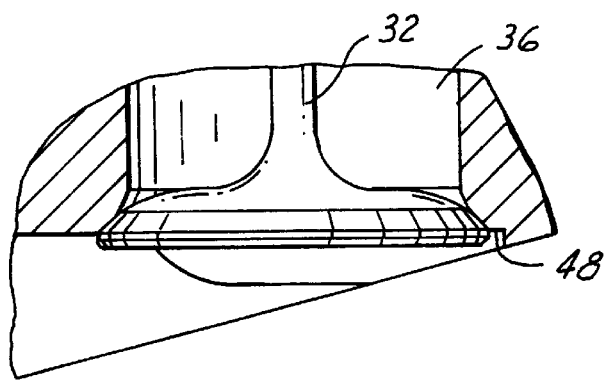
FIG. 10 is a sectional view, partly in elevation, of the cylinder head of FIG. 2, taken along the line 10—10 of FIG. 2.
Figure 11:
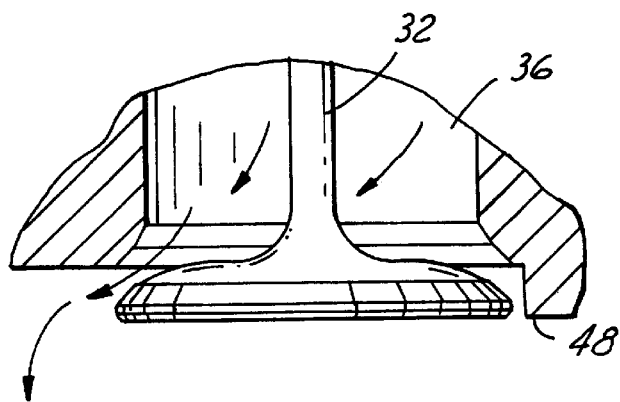
FIG. 11 is a sectional view, partly in elevation, of the cylinder head of FIG. 2, taken along the line 11—11 of FIG. 2.

FIGS. 7–8 illustrate an embodiment having two exhaust valves 34, two intake valves 32, and a mask 48 which is cut away so as to operate predominantly with intake valve 32, which is located closely to fuel injector 50. This will produce a swirl pattern as shown in FIG. 8. In any event, camshaft retard will be used at low to medium loads where it is not necessary to obtain the highest output from the engine. As a result it is possible to employ the pilot mask and, if desired, CMCV 42 for even greater charge motion control, say at idle and very light load. At higher outputs, CMCV 42 will be opened and camshaft timing eventually moved to its base position so that pilot mask 48 ceases to have a significant effect upon flow entering cylinder 14.

Controller 64 will operate fuel injectors 50 such that the engine may be furnished with sufficient fuel to achieve fuel-lean combustion during normal operating conditions and stoichiometric combustion during regeneration of NOx trap 30 associated with engine 10.

Controller 64 operates camshaft drive 62 so that once the timing of camshaft 54 has been established at any particular engine speed and load, timing of camshaft 54 will be maintained at approximately a constant value during both lean and stoichiometric combustion.

While the invention has been shown and described in its preferred embodiments, it will be clear to those skilled in the arts to which it pertains that many changes and modifications may be made thereto without departing from the scope of the invention.

What is claimed is:

1. A reciprocating four-stroke cycle internal combustion engine having a cylinder block with at least one cylinder, a piston, a crankshaft, a connecting rod joining the piston and the crankshaft, an intake manifold, and intake and exhaust poppet valves servicing the cylinder, with said engine further comprising:

a cylinder head mounted upon the cylinder block so as to close the cylinder, with the cylinder block having at least one intake port having a valve seat for the intake valve;

a pilot mask integral with the cylinder head and situated about the valve seat and extending into the cylinder;

a camshaft for actuating at least said intake valve;

a camshaft drive for rotating the camshaft and for adjusting the rotational timing of the camshaft with respect to the crankshaft, with the camshaft having a base timing; and a controller for operating the camshaft drive so as to position the camshaft such that the lift of the intake valve and the height of the pilot mask are approximately equal when the piston is moving at the point of its greatest velocity during the intake stroke.

2. An engine according to claim 1, wherein the controller operates the camshaft drive such that at the base camshaft timing, maximum intake valve lift occurs slightly after the point of maximum piston speed.

3. An engine according to claim 1, additionally comprising a charge motion control valve operated by the controller to further modify the angular momentum of charge entering the cylinder.

4. An engine according to claim 3, wherein the charge motion control valve is operated by the controller such that the valve is closed during operation at low loads and opened during operation at medium to full engine loads.

5. An engine according to claim 1, wherein the pilot mask directs flow past the intake valve until the intake valve has opened to an extent greater than about 30–40% of its total lift.

6. An engine according to claim 1, wherein said controller operates said camshaft drive such that the valve timing is retarded by approximately 40°–60° from base timing whenever the intake valve lift approximates the mask height at the point of maximum piston speed.

7. An engine according to claim 1, further comprising a fuel delivery system operated by said controller such that the engine will be furnished with sufficient fuel to achieve fuel lean combustion during normal operating condition and stoichiometic combustion during regeneration of a NOx trap associated with the engine.

8. An engine according to claim 7, wherein the controller operates the camshaft drive such that once camshaft timing has been established at any particular engine speed and load, the camshaft timing will be maintained at approximately a constant value during both lean and stoichiometric combustion.

9. An engine according to claim 1, wherein the pilot mask extends for about 180° of rotation about the periphery of the head of said intake valve.

10. An engine according to claim 1, wherein the controller operates the camshaft drive such that maximum intake valve lift occurs when the piston speed has decreased to about 80% of its maximum speed.

11. A reciprocating four-stroke cycle internal combustion engine having a cylinder block with at least one cylinder, a piston, a crankshaft, a connecting rod joining the piston and the crankshaft, an intake manifold, and intake and exhaust poppet valves servicing the cylinder, with said engine further comprising:

a cylinder head mounted upon the cylinder block so as to close the cylinder, with the cylinder block having at least one intake port having a valve seat for the intake valve;

a pilot mask situated about the valve seat and extending into the cylinder;

at least one camshaft for actuating said intake and exhaust valves;

a camshaft drive for rotating the camshaft and for adjusting the rotational timing of the camshaft with respect to the crankshaft, with the camshaft having a base timing;

a charge motion control valve; and a controller for operating the camshaft drive and the motion control valve so as to selectively increase the angular momentum of intake charge, with the controller positioning the camshaft such that the lift of the intake valve and the height of the pilot mask are approximately equal when the piston is moving at the point of its greatest velocity during the intake stroke.

12. An engine according to claim 11, further comprising a fuel delivery system operated by said controller such that the engine will be furnished with sufficient fuel to achieve fuel lean combustion during normal operating conditions and stoichiometric combustion during regeneration of a NOx trap associated with the engine.

13. An engine according to claim 11, having two intake valves per cylinder.

14. An engine according to claim 13, wherein both of said intake valves are masked.

15. An engine according to claim 13, wherein each of said cylinders has a single exhaust valve.

16. An engine according to claim 13, wherein only one of said intake valves is masked.

17. An engine according to claim 11, having two intake valves, with only one of said intake valves being masked and with the other of said intake valves being furnished air through a secondary runner having a port throttle for controlling the airflow through the secondary runner.

18. An engine according to claim 11, wherein said charge motion control valve is closed during idle and light load operation and opened during operation of the engine at heavy loads.

* * * * *